(12) United States Patent
Chang

(10) Patent No.: US 7,513,655 B2
(45) Date of Patent: Apr. 7, 2009

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (JP)

( * ) Notice: Subject to any disclaimer, the term of this patent is extended or adjusted under 35 U.S.C. 154(b) by 78 days.

(21) Appl. No.: 11/557,914

(22) Filed: Nov. 8, 2006

(65) Prior Publication Data

US 2008/0037274 A1 Feb. 14, 2008

(30) Foreign Application Priority Data

Aug. 11, 2006 (CN) .......................... 2006100620065

(51) Int. Cl.
*F21V 5/00* (2006.01)
(52) U.S. Cl. .................. 362/332; 362/619; 362/627
(58) Field of Classification Search ................ None
See application file for complete search history.

(56) References Cited

U.S. PATENT DOCUMENTS 6,979,112 B2 * 12/2005 Yu et al. ................. 362/600

2006/0001794 A1 * 1/2006 Nitto et al. ................ 349/58
2006/0104084 A1 * 5/2006 Amemiya et al. .......... 362/561
2007/0114555 A1 * 5/2007 Takemoto et al. ............ 257/99
2007/0133095 A1 * 6/2007 Schenke et al. ............ 359/614

FOREIGN PATENT DOCUMENTS

CN 1779522 5/2006
JP 2003-241191 8/2003

* cited by examiner

*Primary Examiner*—John A Ward
(74) *Attorney, Agent, or Firm*—Steven M. Reiss

(57) ABSTRACT

An optical plate (32) includes a transparent plate (321) and a light diffusion layer (322). The transparent plate includes a light output surface (3211), a light input surface (3213) opposite to the light output surface, and a plurality of spot-shaped depressions (3215) at the light input surface. The light diffusion layer is coated on the light input surface and the spot-shaped depressions, and covers the light input surface completely. The light diffusion layer includes transparent resin matrix material, and first and second light diffusion particles dispersed in the transparent resin matrix material uniformly. A refractive index of the second light diffusion particles is greater than that of the first light diffusion articles. A backlight module (30) using the present optical plate is also provided. The backlight module using the optical plate can have a thin body with a good optical performance.

17 Claims, 9 Drawing Sheets

OPTICAL PLATE AND BACKLIGHT MODULE USING THE SAME

This application is one of four co-pending U.S. patent applications, which is: application Ser. No. 11/550,379, filed on Oct. 17, 2006, and entitled "OPTICAL PLATE AND BACKLIGHT MODULE USING THE SAME"; application Ser. No. 11/557,914, filed on Nov. 8, 2006, and entitled "OPTICAL PLATE AND BACKLIGHT MODULE USING THE SAME"; application Ser. No. 11/565,575, filed on Nov. 30, 2006, and entitled "OPTICAL PLATE WITH DIFFUSION LAYER AND BACKLIGHT MODULE USING THE SAME"; application Ser. No. 11/566,836, filed on Dec. 5, 2006, and entitled "OPTICAL PLATE WITH DIFFUSION LAYER AND BACKLIGHT MODULE USING THE SAME". In the co-pending applications, the inventors are Shao-Han Chang. The co-pending applications have the same assignee as the present application. The disclosure of the above identified application is incorporated herein by reference.

BACKGROUND OF THE INVENTION

1. Field of the Invention

The present invention relates to optical plates; and more particularly to an optical plate and a backlight module using the optical plate, which devices are for use in, for example, a liquid crystal display (LCD).

2. Discussion of the Related Art

In a liquid crystal display device, liquid crystal is a substance that does not itself radiate light. Instead, the liquid crystal relies on light received from a light source, in order that the liquid crystal can provide displaying of images and data. In a typical liquid crystal display device, a backlight module powered by electricity supplies the needed light.

FIG. 8 represents a typical direct type backlight module 10. The backlight module 10 includes a housing 11, a plurality of light emitting diodes 12, a light diffusion plate 13, a light diffusion sheet 14, and a prism sheet 15. The housing 111 includes a base 111, and a plurality of sidewalls 113 extending from a periphery of the base 111. The sidewalls 113 cooperatively form an opening 112. The light diffusion plate 13, the light diffusion sheet 14 and the prism sheet 15 are stacked in that order on the housing 11 above the opening 112. The light emitting diodes 12 are positioned on the base 111 of the housing 11 in a matrix arrangement. Light rays emitted from the light emitting diodes 12 are substantially diffused in the light diffusion plate 13, and finally surface light rays are output from the prism sheet 15.

However, to enhance the uniformity of light rays output by the backlight module 10, there must be a certain space between the light diffusion plate 13 and the light emitting diodes 12. This space reduces or eliminates dark areas that can occur due to reduced intensity of light between adjacent light emitting diodes 12. Therefore the backlight module 10 may be unduly thick for certain applications. Alternatively, the light diffusion plate 13 can be constructed to provide thorough diffusion of light passing therethrough. In such case, the thickness of the backlight module 10 is typically required to be in the range of about 2 to 3 centimeters, which may be unduly thick for certain applications.

In addition, the light diffusion plate 13 is typically manufactured by uniformly dispersing a plurality of light diffusion particles 132 into a transparent resin matrix material 131. Since numerous light rays are diffused by the light diffusion particles 132 a number of times in the light diffusion plate 13, a significant amount of light energy may be lost. As a result, the brightness of light output by the backlight module 10 is decreased.

Furthermore, the light diffusion plate 13, the light diffusion sheet 14, and the prism sheet 15 are in contact with each other, but with a plurality of air pockets existing at the boundaries therebetween. When the backlight module 10 is in use, light rays pass through the air pockets, and some of the light rays undergo total reflection at one or another of the corresponding boundaries. Thus the light energy utilization ratio of the backlight module 10 is decreased.

What is needed, therefore, is an optical plate and a backlight module using the optical plate that can overcome the above-mentioned shortcomings.

SUMMARY

An optical plate according to a preferred embodiment includes a transparent plate and a light diffusion layer. The transparent plate includes a light output surface, a light input surface opposite to the light output surface, and a plurality of spot-shaped depressions at the light input surface. The light diffusion layer is coated on the light input surface and the spot-shaped depressions, and covers the light input surface completely. The light diffusion layer includes transparent resin matrix material, and first and second light diffusion particles dispersed in the transparent resin matrix material uniformly. A refractive index of the second light diffusion particles is greater than that of the first light diffusion particles.

A backlight module according to a preferred embodiment includes a housing, a plurality of point light sources, and an optical plate. The same optical plate as described in the previous paragraph is employed in this embodiment. The housing includes a base and a plurality of sidewalls extending from the peripheral of the base. The sidewalls cooperatively form an opening. The optical plate is positioned on the top of the housing above the opening. The point light sources are regularly positioned on the base in one-to-one correspondence with the spot-shaped depressions.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
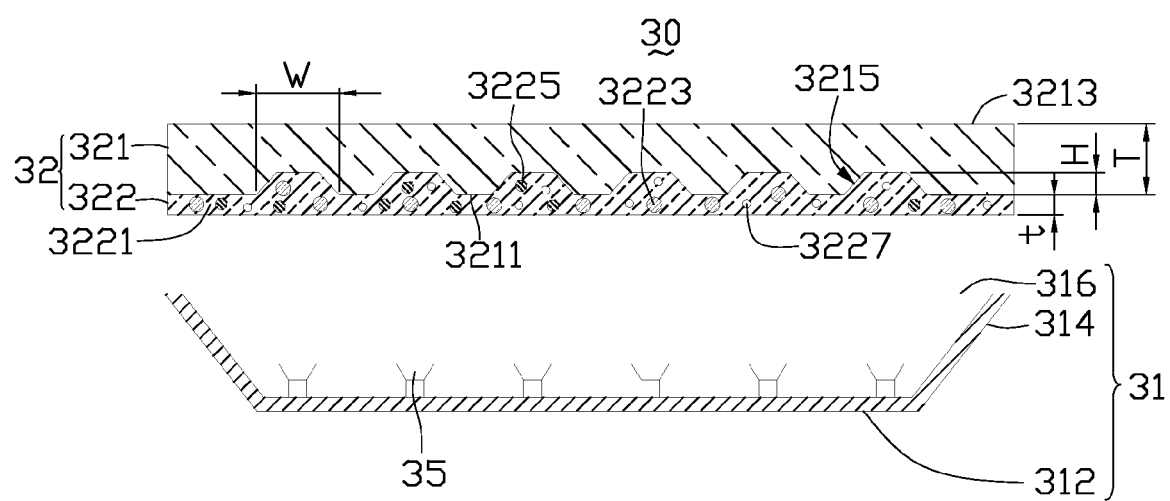
FIG. 1 is an exploded, side, cross-sectional view of a backlight module using an optical plate according to a first preferred embodiment of the present invention.

Referring to FIG. 1, a backlight module 30 in accordance with a first preferred embodiment is shown. The backlight module 30 includes a housing 31, an optical plate 32, and a plurality of light emitting diodes 35. The housing 31 includes a base 312, and a plurality of sidewalls 314 extending from a periphery of the base 312. The sidewalls 314 cooperatively define an opening 316. The light emitting diodes 35 are regularly arranged on the base 312 in a matrix. The optical plate 32 is positioned on top of the housing 31 above the opening 316. Light rays emitted from the light emitting diodes 35 are substantially diffused in the optical plate 32, and outputted as surface light rays from the optical plate 32.

The optical plate 32 includes a transparent plate 321 and a light diffusion layer 322. The transparent plate 321 includes a light input surface 3211, and a light output surface 3213 opposite to the light input surface 3211. A plurality of spot-shaped depressions 3215 is formed in the transparent plate 321 at the light input surface 3211. Each spot-shaped depression 3215 has a vertical central axis of symmetry. The spot-shaped depression 3215 has a flat inmost end, and is frustum-shaped. That is, the spot-shaped depression 3215 tapers from the inmost end thereof to an outmost extremity thereof coplanar with the light input surface 3211, with the outmost extremity being larger than the inmost end. In this embodiment, each spot-shaped depression 3215 has an isosceles trapezoidal cross-section taken along a plane passing through the central symmetry axis thereof. The light diffusion layer 322 is coated on the light input surface 3211 and the spot-shaped depressions 3215 (see below). The light output surface 3213 of the transparent plate 321 and an outer surface (not labeled) of the light diffusion layer 322 are both flat surfaces. The light emitting diodes 35 are located in one-to-one correspondence with the spot-shaped depression 3215.

Figure 2:
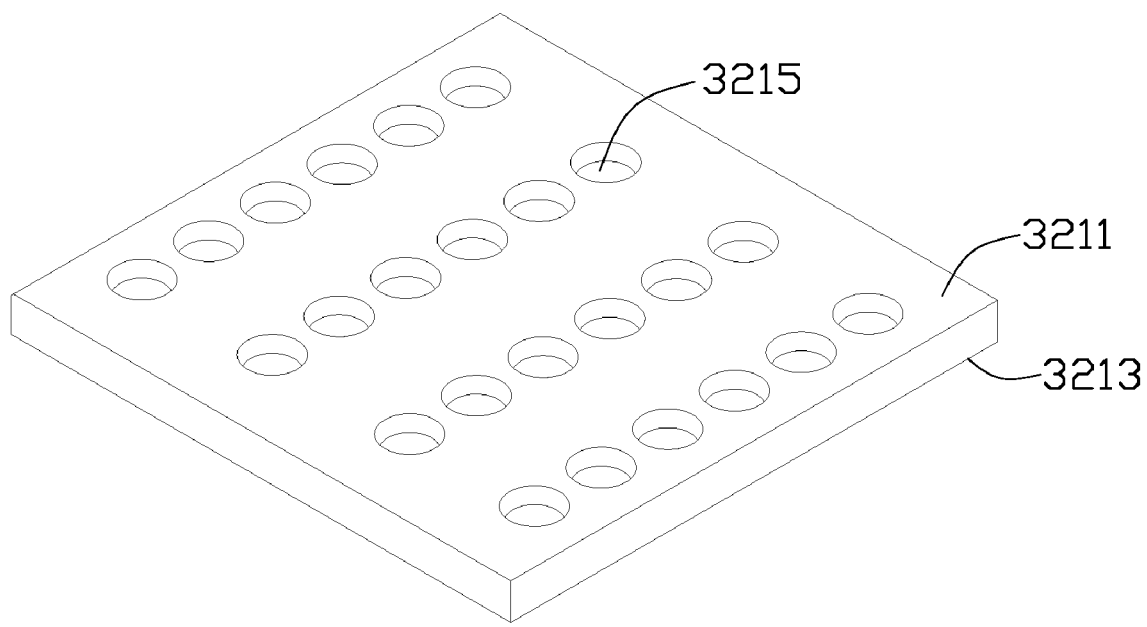
FIG. 2 is an isometric, inverted view of a transparent plate of the optical plate of FIG. 1.

Also referring to FIG. 2, the transparent plate 321 can be made from material selected from the group consisting of polycarbonate (PC), polymethyl methacrylate (PMMA), polystyrene (PS), copolymer of methylmethacrylate and styrene (MS), and any suitable combination thereof. A maximum thickness T of the transparent plate 321 is configured to be in the range from 1.0 millimeter to 6.0 millimeters. In consideration of light diffusing effects, a ratio of a depth H of the spot-shaped depressions 3215 to the thickness T of the transparent plate 321 is preferably less than 0.3. Thus, the depth H is configured to be in the range from about 0.3 millimeters to about 2.4 millimeters. A diameter W of an outmost edge of each spot-shaped depression 3215 is configured to be equal to or larger than that of the corresponding light emitting diode 35.

The light diffusion layer 322 includes, by weight, transparent resin matrix material in an amount of 5 to 90 percent, and first and second light diffusion particles 3223, 3225 in a combined amount of 10 to 95 percent. The first and second light diffusion particles 3223, 3225 are dispersed into the transparent resin matrix material 3221 uniformly. A ratio by weight of the first light diffusion particles 3223 to the second light diffusion particles 3225 is in the range from 5 to 100.

The light diffusion layer 322 is manufactured by solidifying a varnish in which the first and second light diffusion particles 3223, 3225 are dispersed. The varnish can be selected from the group consisting of acrylic varnish, acrylic amine varnish, epoxy resin varnish, and any suitable combination thereof. Accordingly, the transparent resin matrix material 3221 may be one of acrylic, acrylic amine, and epoxy resin materials.

A refractive index of the second light diffusion particles 3225 is larger than that of the first light diffusion particles 3223. The refractive index of the first light diffusion particles 3223 is typically in the range from about 1.4 to about 1.7. The refractive index of the second light diffusion particles 3225 is larger than 2.0, and is preferably in the range from about 2.1 to about 2.8. A diameter of the first light diffusion particles 3223 is larger than that of the second light diffusion particles 3225. The diameter of the first light diffusion particles 3223 is typically in the range from about 1 micron to 500 microns, and the diameter of the second light diffusion particles 3225 is in a range from about 0.01 microns to about 1 micron.

The first light diffusion particles 3223 typically can diffuse the light rays from the light emitting diodes 35 before the second light diffusion particles 3225. The second light diffusion particles 3225 may further diffract and reflect the light rays, due to their smaller size and larger refractive index compared to the first light diffusion particles 3223. Therefore the light diffusion layer 322 has good light diffusion capability with the cooperative effects of the first and second light diffusion particles 3223, 3225. Accordingly, the light diffusion layer 322 of the optical plate 32 may be configured to be very thin, with the optical plate 32 still achieving relatively uniform light diffusion.

In this embodiment, in order to attain good light diffusion effects, a minimum thickness t of the light diffusion layer 322 is configured to be greater than 15% of T. Thus the thickness t is greater than or equal to 0.15 millimeters. In addition, because the light emitting diodes 35 are positioned in one-to-one correspondence with the spot-shaped depressions 3215 and the light diffusion layer 322 is filled in the spot-shaped depressions 3215, a thickness of portions of the light diffusion layer 322 above the light emitting diodes 35 is greater than that of other portions of the light diffusion layer 322. Therefore the portions of the optical plate 32 above the light emitting diodes 35 have relatively low illumination corresponding to their relatively close proximity to the light emitting diodes 35. Accordingly, a distance from the light emitting diodes 35 to the optical plate 32 may be configured to be very short, with little or no risk of dark areas occurring due to reduced intensity of light between adjacent light emitting diodes 35. Thus the backlight module 30 can have a thin configuration while still providing good, uniform optical performance.

The first light diffusion particles 3223 may be selected from the group consisting of polystyrene (PS) particles, polycarbonate (PC) particles, styrene acrylonitrile copolymer particles, polypropylene particles, polymethyl methacrylate (PMMA) particles, glass beads, silicon dioxide ($SiO_2$) particles, quartz particles, and any suitable combination thereof. The second light diffusion particles 3225 may be selected from a group consisting of titanium dioxide (TiO$_2$) particles, barium sulfate (BaSO$_4$) particles, zinc sulfide (ZnS) particles, zinc oxide (ZnO) particles, antimony oxide (Sb$_2$O$_3$ or Sb$_2$O$_5$) particles, calcium carbonate (CaCO$_3$) particles, and any suitable combination thereof.

When the light emitting diodes 35 are ultraviolet light emitting diodes, a significant amount of ultraviolet rays are produced in use. Since the transparent plate 321 of the optical plate 32 is formed of transparent synthetic resin material, the transparent plate 321 may be subject to color change and physical transformation problems due to the effects of long-term irradiation by the ultraviolet rays. In particular, the long-term irradiation is liable to cause serious problems relating to low optical uniformity, poor brightness, and worsening optical performance of the backlight module 30. In order to solve or at least mitigate these potential problems, the light diffusion layer 322 can further include a plurality of fluorescent particles 3227 uniformly dispersed in the transparent resin matrix material 3221 along with the first and second light diffusion particles 3223, 3225. A ratio by weight of the fluorescent particles 3227 to the first light diffusion particles 3223 is preferably less than 0.1 percent. When ultraviolet rays irradiate the fluorescent particles 3227, a significant amount of the ultraviolet rays are converted into visible light and infrared light. Therefore, the light energy utilization ratio of the backlight module 30 is increased.

Figure 3:
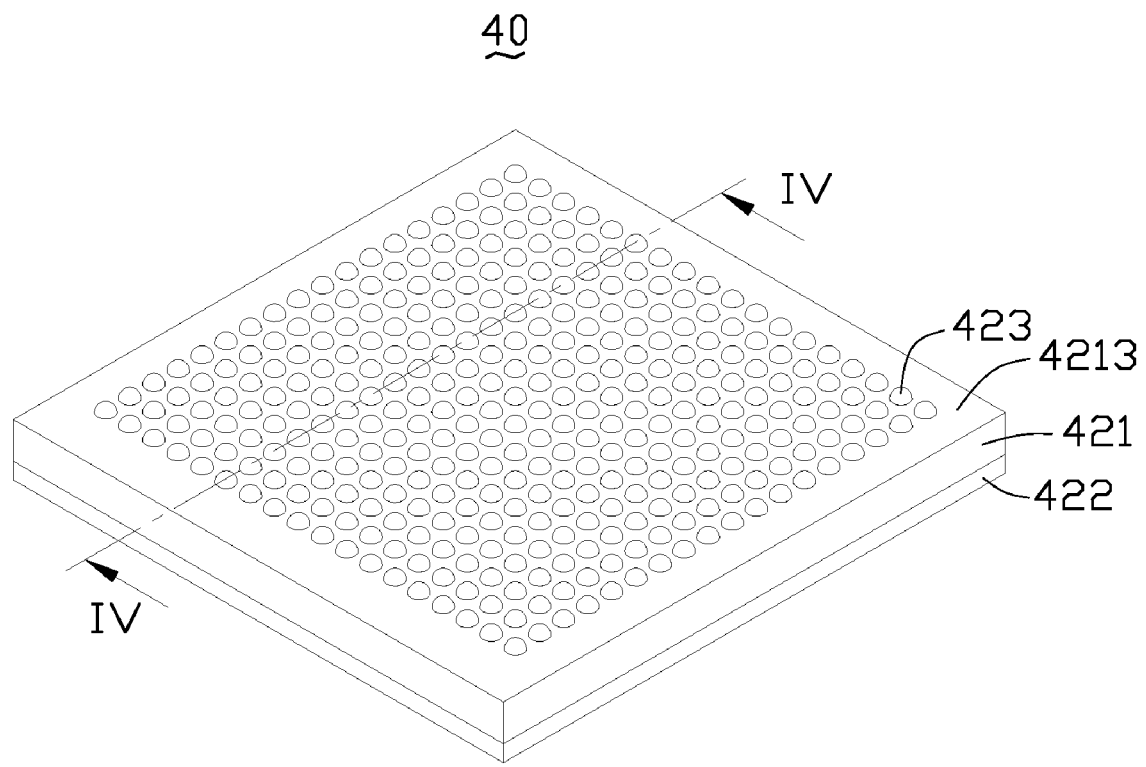
FIG. 3 is an isometric view of an optical plate according to a second preferred embodiment of the present invention.
Figure 4:
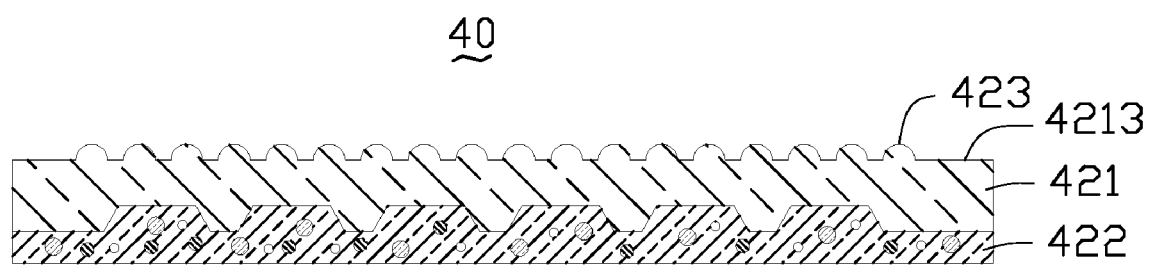
FIG. 4 is a cross-sectional view taken along line IV-IV of FIG. 3.

Referring to FIGS. 3 and 4, an optical plate 40 in accordance with a second preferred embodiment is shown. The optical plate 40 is similar in principle to the optical plate 32 of the first embodiment, except that the optical plate 40 further includes a plurality of hemispherical protrusions 423 formed on a light output surface 4213 of a transparent plate 421 thereof. The hemispherical protrusions 423 are arranged separately from each other in a regular matrix on the light output surface 4213. A diameter of each hemispherical protrusion 423 is configured to be in the range from about 10 microns to about 500 microns. The transparent plate 421 and the hemispherical protrusions 423 may be integrally manufactured as a single body by injection molding. When the optical plate 40 is utilized in a backlight module, light rays from light emitting diodes (not shown) enter the optical plate 40. The light rays are substantially diffused in a light diffusion layer 422 of the optical plate 40. Many or most of the light rays are condensed by the hemispherical protrusions 423 of the optical plate 40 before they exit the light output surface 4313. Thereby, a brightness of the backlight module is increased.

In this embodiment, the optical plate 40 may replace a light diffusion plate and a prism sheet that are ordinarily used in a backlight module. Therefore, air pockets that would ordinarily exist in the backlight module are eliminated, and loss of light energy in the backlight module is reduced. In addition, because the single optical plate 40 can be used in place of both a light diffusion plate and a prism sheet, the cost of the backlight module is reduced.

Figure 5:
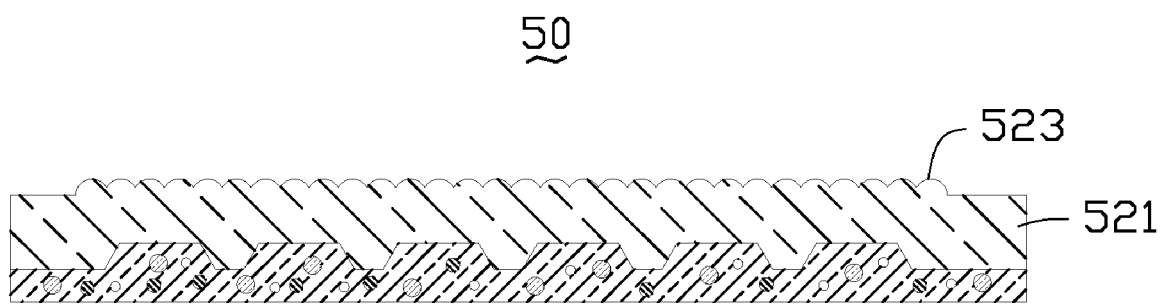
FIG. 5 is a side, cross-sectional view of an optical plate according to a third preferred embodiment of the present invention.

Referring to FIG. 5, an optical plate 50 in accordance with a third preferred embodiment is shown. The optical plate 50 is similar in principle to the optical plate 40 of the second embodiment, except that hemispherical protrusions 523 of a transparent plate 521 of the optical plate 50 are all interconnected with one another to form a regular, continuous microstructure pattern. Many or most of light rays passing through the transparent plate 521 are condensed by the hemispherical protrusions 523 before exiting the optical plate 50. Thereby, a brightness of a corresponding backlight module is increased.

In an alternative embodiment, prism lens structures may be formed on the light output surface of the transparent plate of the optical plate instead of the hemispherical protrusions. The prism lens structures can be configured for increasing the brightness of a corresponding backlight module. Further, the optical plate is not limited to the above-described embodiments. For example, referring to FIGS. 9(a) to 9(e), the optical plate may include other suitable brightness enhancement structures formed on the light output surface 3213 thereof, such as hemispherical concavities 24, V-shaped protrusions 25, V-shaped grooves 26, arc-shaped protrusions 27, arc-shaped grooves 28, and the like.

Figure 6:
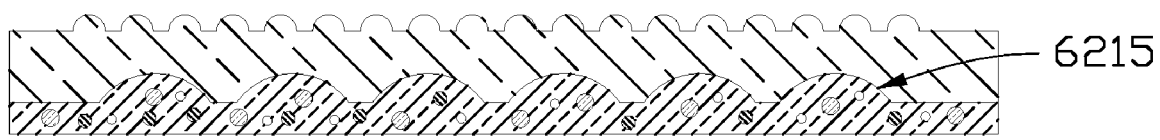
FIG. 6 is a side, cross-sectional view of an optical plate according to a fourth preferred embodiment of the present invention.

Referring to FIG. 6, an optical plate 60 in accordance with a fourth preferred embodiment is shown. The optical plate 60 is similar in principle to the optical plate 40 of the second embodiment, except that each of spot-shaped depressions 6215 has an arc-shaped cross-section taken along a plane passing through a vertical central axis of symmetry thereof. In alternative embodiments, the spot-shaped depressions 6215 can instead have arcuate cross-sections or curved cross-sections.

Figure 7:
FIG. 7 is a side, cross-sectional view of an optical plate according to a fifth preferred embodiment of the present invention.
Figure 8:
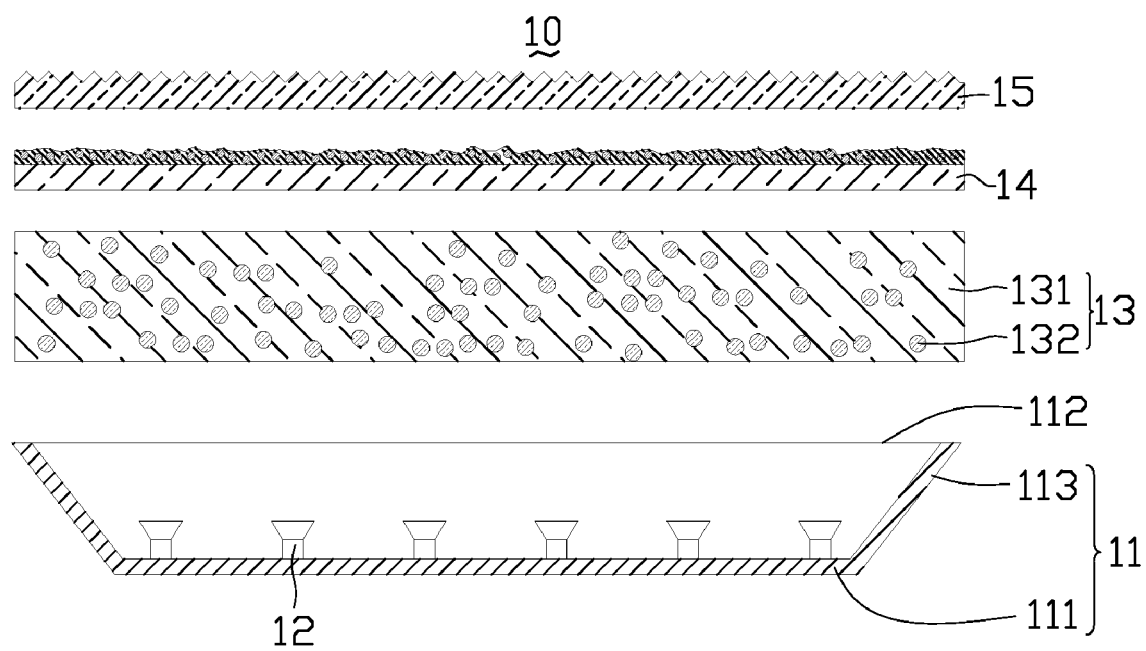
FIG. 8 is an exploded, side, cross-sectional view of a conventional backlight module.
Figure 9:
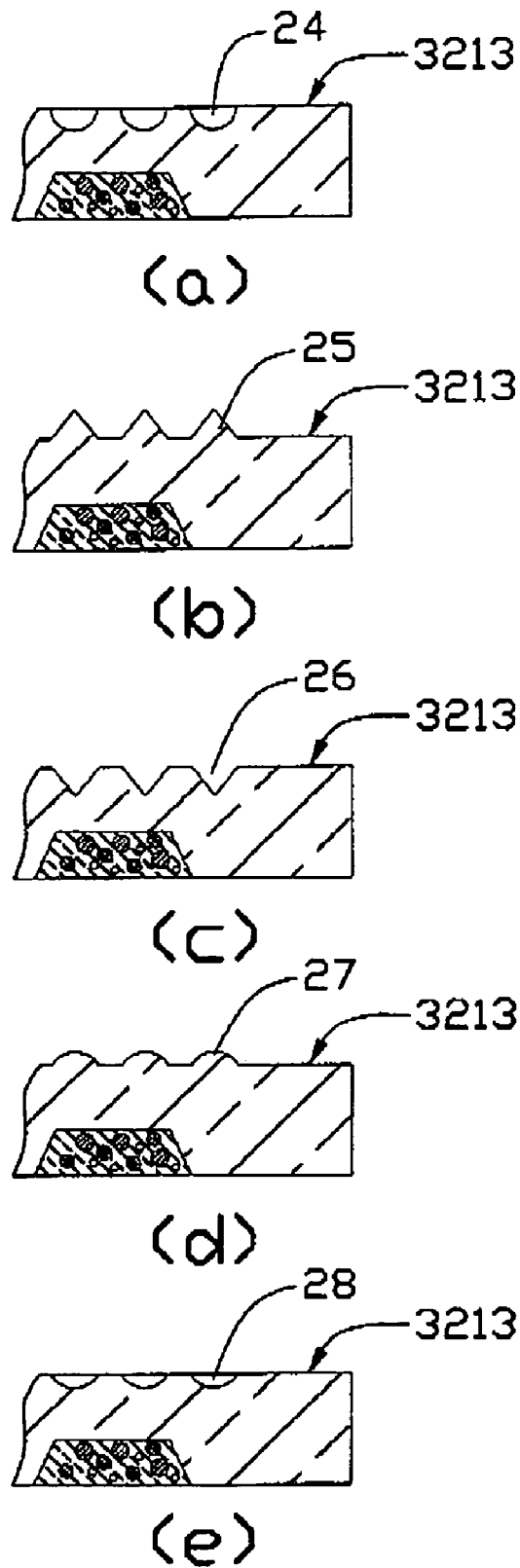
FIGS. 9(a) to 9(e) are partially, side cross-sectional views of five optical plates in accordance with sixth to tenth embodiments of the present invention.

Referring to FIG. 7, an optical plate 70 in accordance with a fifth preferred embodiment is shown. The optical plate 70 is similar in principle to the optical plate 32 of the first embodiment, except that each of spot-shaped depressions 7215 has an isosceles triangular cross-section taken along a plane passing through a vertical central axis of symmetry thereof.

It is noted that the scope of the present optical plate is not limited to the above-described embodiments. Various numbers and shapes of spot-shaped depressions, point light sources and brightness enhancement structures have been described and illustrated for the purposes of conveniently demonstrating various principles of the present invention.

Finally, while particular embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
a transparent plate including:
a light output surface,
a light input surface opposite to the light output surface, and
a plurality of spot-shaped depressions at the light input surface; and
a light diffusion layer coated on the light input surface and the spot-shaped depressions, and covering the light input surface completely, wherein the light diffusion layer comprises transparent resin matrix material, and first and second light diffusion particles dispersed in the transparent resin matrix material uniformly, and a refractive index of the second light diffusion particles is greater than that of the first light diffusion particles.

2. The optical plate according to claim 1, wherein each spot-shaped depression is frustum-shaped, wherein a size of an inmost end of the spot-shaped depression is less than a size of an outmost extremity of the spot-shaped depression.

3. The optical plate according to claim 2, wherein each spot-shaped depression has one of the following cross-sections taken along a plane passing through a central axis of symmetry of the spot-shaped depression: isosceles triangular, trapezoidal, arcuate, or arc-shaped.

4. The optical plate according to claim 1, wherein the refractive index of the first light diffusion particles is in the range from about 1.4 to about 1.7, and the refractive index of the second light diffusion particles is greater than 2.0.

5. The optical plate according to claim 1, wherein the light diffusion layer comprises, by weight, the transparent resin matrix material in an amount of 5 to 90 percent, and the first and second light diffusion particles in a combined amount of 10 to 95 percent, and a ratio by weight of the first light diffusion particles to the second light diffusion particles is in the range from 5 to 100.

6. The optical plate according to claim 1, wherein the first light diffusion particles are selected from the group consisting of polystyrene particles, polycarbonate particles, styrene acrylonitrile copolymer particles, polypropylene particles, polymethyl methacrylate particles, glass beads, silicon dioxide particles, quartz particles, and any combination thereof.

7. The optical plate according to claim 1, wherein the second light diffusion particles are selected from the group consisting of titanium dioxide particles, barium sulfate particles, zinc sulfide particles, zinc oxide particles, antimony oxide particles, calcium carbonate particles, and any combination thereof.

8. The optical plate according to claim 1, wherein the light diffusion layer further comprises a plurality of fluorescent particles dispersed in the transparent resin matrix material, and a ratio by weight of the fluorescent particles to the first light diffusion particles is less than 1 percent.

9. The optical plate according to claim 1, further comprising a plurality of brightness enhancement structures formed at the light output surface thereof.

10. The optical plate according to claim 9, wherein the brightness enhancement structures are selected from the group consisting of hemispherical protrusions, hemispherical concavities, V-shaped protrusions, V-shaped grooves, arc-shaped protrusions, and arc-shaped grooves.

11. The optical plate according to claim 10, wherein the hemispherical protrusions are arranged separately from each other in a matrix.

12. The optical plate according to claim 10, wherein the hemispherical protrusions are interconnected with one another to form a continuous microstructure pattern.

13. A backlight module comprising:
a housing having a base and a plurality of sidewalk extending from the base, the sidewalls cooperatively forming an opening;
an optical plate disposed over the opening, the optical plate including a light output surface, a light input surface opposite to the light output surface, a plurality of spot-shaped depressions at the light input surface arranged in a matrix, and a light diffusion layer coated on the light input surface and the spot-shaped depressions, and covering the light input surface completely; and
a plurality of point light sources positioned on the base in one-to-one correspondence with the spot-shaped depressions, wherein the light diffusion layer comprises transparent resin matrix material, and first and second light diffusion particles are dispersed in the transparent resin matrix material uniformly, and a refractive index of the second light diffusion articles is greater than that of the first light diffusion particles.

14. The backlight module according to claim 13, wherein each spot-shaped depression is frustum-shaped, and a size of an inmost end of each spot-shaped depression is less than a size of an outmost extremity of each spot-shaped depression.

15. The backlight module according to claim 14, wherein each spot-shaped depression has one of the following cross-sections taken along a plane passing through a central axis of symmetry of the spot-shaped depression: isosceles triangular, trapezoidal, arcuate, or arc-shaped.

16. The backlight module according to claim 13, wherein the refractive index of the first light diffusion particles is in the range from about 1.4 to about 1.7 and the refractive index of the second light diffusion particles is greater than 2.0.

17. The backlight module according to claim 13, wherein the light diffusion layer comprises by weight, the transparent resin matrix material in an amount of 5 to 90 percent, and the first and second light diffusion particles in a combined amount of 10 to 95 percent and a ratio by weight of the first light diffusion particles to the second light diffusion particles is in the range from 5 to 100.

* * * * *